United States Patent [19]

Nakamura et al.

[11] Patent Number: 4,963,021
[45] Date of Patent: Oct. 16, 1990

[54] PHOTOELECTRIC SWITCHING APPARATUS

[75] Inventors: Arata Nakamura, Kyoto; Saburo Yamamoto, Takatsuki, both of Japan

[73] Assignee: Omron Tateisi Electronics Company, Hanazono, Japan

[21] Appl. No.: 46,333

[22] Filed: May 6, 1987

[30] Foreign Application Priority Data

May 6, 1986 [JP] Japan .................... 61-104222

[51] Int. Cl.$^5$ ............................ H01H 35/00
[52] U.S. Cl. .................... 356/153; 350/445
[58] Field of Search .......... 356/342, 445, 446, 447, 356/448, 153; 350/445, 527; 250/574

[56] References Cited

U.S. PATENT DOCUMENTS

| | | | |
|---|---|---|---|
| 2,701,501 | 2/1955 | Cuny | 356/153 |
| 2,750,677 | 6/1956 | Wirth | 350/445 |
| 2,841,048 | 7/1958 | Duncan et al. | 350/445 |
| 3,584,227 | 6/1971 | Matsas | 250/227 |
| 4,017,186 | 4/1977 | Shofner | 356/342 |
| 4,746,179 | 5/1988 | Dahne et al. | 356/133 |

FOREIGN PATENT DOCUMENTS 2569015 2/1986 France .
116512 7/1983 Japan .................... 350/445

OTHER PUBLICATIONS

IBM Technical Disclosure Bulletin, vol. 22, No. 12, May 1980, pp. 5288–5290, W. B. Archey et al: "Low Loss Optical Coupler" (whole article).

Primary Examiner—Richard A. Rosenberger
Attorney, Agent, or Firm—Foley & Lardner, Schwartz, Jeffery, Schwaab, Mack, Blumenthal & Evans

[57] ABSTRACT

A photoelectric switching apparatus comprises: a light projecting device; a photo sensing device; an objective lens having a double structure comprising an outer peripheral portion and a central portion each of which acts as a lens; and a reflecting surface to deflect the lights on the optical axis of the central portion of the objective lens to the side. An elongated portion which extends on the optical axis of the central portion of the objective lens and has the reflecting surface at the end portion thereof is formed integrally with the objective lens.

4 Claims, 3 Drawing Sheets

PHOTOELECTRIC SWITCHING APPARATUS

BACKGROUND OF THE INVENTION

1. Field of the Invention

The present invention relates to the improvement of a reflecting type photoelectric switching apparatus.

2. Description of the Related Art

As shown in FIG. 5, what is called a coaxial reflecting type photoelectric switching apparatus in which the optical axis of the projected light coincides with the optical axis of the incident light has been conceived by the inventors during the development of the present invention. Light emitting diodes (LEDs) 170A and 170B serving as light projecting devices for emitting the lights having different wavelengths and a photo sensing device 120 for sensing the incident light are fixed to the casing 110. An objective lens 140 is also fixed to the casing 110. The objective lens 140 is constituted by a central portion 144 which functions for the emitted light and an outer peripheral portion 143 which functions for the incident light. A light receiving lens 130 is provided on the side of the photo sensing device 120 of the objective lens 140. A reflecting mirror member 146 is fixed to the surface of the lens 130 on the side of the lens 140. The reflecting mirror member 146 is disposed in such a manner that its reflecting surface 146a is located on the optical axis of the central portion 144 of the objective lens 140. Between the reflecting mirror member 146 and the LED 170B, a projecting lens 180 and a projecting half mirror 160 are respectively fixed to the casing 110.

The light beam emitted from the LED 170B is transmitted through the half mirror 160. The light beam emitted from the LED 170A is reflected by the half mirror 160. Both of these light beams are focused as projected light beams Le onto the reflecting surface 146a of the reflecting mirror member 146 by the projecting lens 180. The projected light beams Le are further reflected by the reflecting surface 146a and collimated by the central portion 144 of the objective lens 140 and projected toward an object to be detected (not shown). A part of the reflected light from the object enters as incident light beams Lr into the outer peripheral portion 143 of the objective lens 140 and is further focused onto the photo sensing device 120 by the light receiving lens 130. A cylindrical separator 150 to separate the projected light beams Le and the incident light beams Lr is provided between the reflecting mirror member 146 and the objective lens 140.

In the foregoing photoelectric switching apparatus, the reflecting mirror member 146 is formed separately from the lenses 130 and 140. Therefore, the reflecting mirror member 146 needs to be fixed to the lens 130 or objective lens 140 with high accuracies with respect to the position and angle. This assembling work is very difficult. In addition, there are such inconveniences that the number of parts increases and the cost of the photoelectric switching apparatus increases.

SUMMARY OF THE INVENTION

It is an object of the present invention to provide a photoelectric switching apparatus which can be easily assembled and which can reduce the cost.

According to the present invention, a photoelectric switching apparatus comprises: light projecting means; photo sensing means; objective lens means of a double structure having an outer peripheral portion and a central portion which function as lenses, respectively; and a reflecting surface to deflect the light on the optical axis in the central portion of the objective lens means to the side, wherein the objective lens means is integrally formed with an elongated portion which extends on the optical axis of the central portion of the objective lens means and in which the reflecting surface is formed at the end portion.

Since the reflecting surface is formed integrally with the objective lens means and they are constituted as a single part, the number of parts is reduced. In assembling of the apparatus, there is no need to arrange the reflecting surface to the objective lens at the accurate position and angle. The assembling process becomes easy.

DETAILED DESCRIPTION OF THE PREFERRED EMBODIMENT

A preferred embodiment of the present invention will be described in detail hereinbelow with reference to FIGS. 1 to 4.

Figure 1:
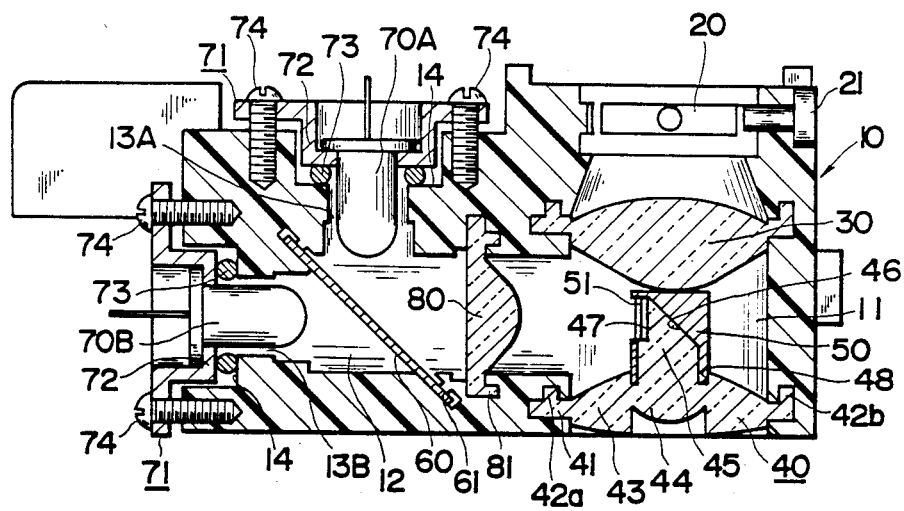
FIG. 1 is a vertical sectional view showing a photoelectric switching apparatus according to an embodiment of the present invention.

FIG. 1 is a vertical sectional view showing a photoelectric switching apparatus according to a preferred embodiment of the invention. In this diagram, a space 11 serving as a first optical path and a space 12 serving as a second optical path and communicating with the first optical path 11 are formed in a casing 10 made of a synthetic resin. The first optical path space 11 vertically penetrates the right half portion of the casing 10 in FIG. 1. A photo sensing device 20 consisting of a photo transistor or the like is arranged in the casing 10 at the position of the upper end portion of the optical path 11 and fixed to the casing 10 by a pin 21. An objective lens 40 is attached into the casing 10 at the position of the lower end portion of the first optical path 11. A focusing lens 30 for photo reception is disposed between the photo sensing device 20 and the objective lens 40.

Figure 4:
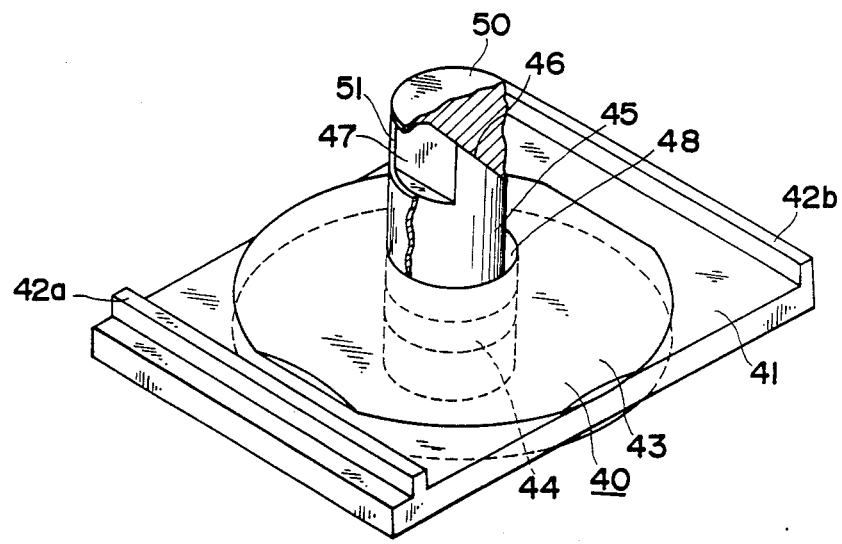
FIG. 4 is an enlarged perspective view of an objective lens in the photoelectric switching apparatus of FIG. 1.
Figure 5:
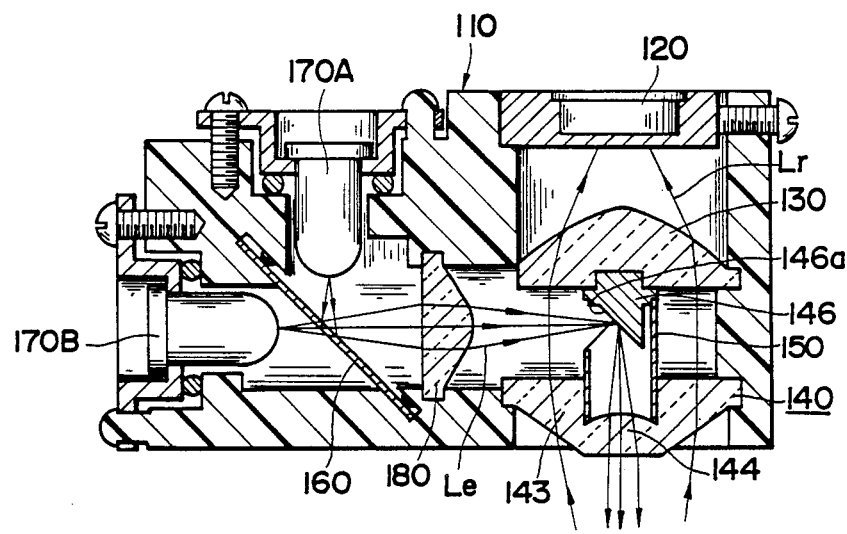
FIG. 5 is a vertical sectional view showing a forerunner of the photoelectric switching apparatus according to the present invention.

A detailed structure of the objective lens 40 will be clearly understood by reference to FIG. 4. The objective lens 40 has a coaxial double structure comprising a central portion 44 which acts on the projected light beams Le and an outer peripheral portion 43 which is arranged around the central portion 44 and acts on the incident light beams Lr. A supporting portion 41 is integrally formed with the outer peripheral portion 43 and is projected from both side edges thereof like a flat plate. Projecting portions 42a and 42b are upwardly formed on the edge portions on both sides of the supporting portion 41, respectively. The objective lens 40 is supported and fixed into the casing 10 by use of the supporting portion 41 and projecting portions 42a and 42b (refer to FIG. 1). An elongated portion 45 which is formed integrally with the lends 40 is upwardly extended from the upper surface of the central portion 44. A reflecting surface 46 is formed on the upper end of the elongated portion 45. The angle of the reflecting surface 46 to the axial direction of the elongated portion 45 is set to 45°. It will be appreciated that this angle is not limited to only 45° but may be also set to a proper value in accordance with the positions of light emitting devices 70A and 70B, the photo sensing device 20, and the like. A metal film such as aluminum or the like is evaporation deposited on the reflecting surface 46. The side surface of the upper end portion of the elongated portion 45 is formed like a flat surface, thereby forming a flat incident surface 47. An annular groove 48 adapted to fix a separator 50, which will be explained hereinafter, is formed between the outer peripheral portion 43 and the elongated portion 45. The objective lens 40 and elongated portion 45 are formed of transparent glass, transparent plastics, or the like.

The cylindrical separator 50 is attached onto the elongated portion 45 so as to cover it (refer to FIGS. 1 and 4; this part is illustrated in FIG. 4 with a part cut away). A window hole 51 whose position is coincident with the incident surface 47 is formed in the separator 50. A lower end portion of the separator 50 is inserted into the annular groove 48. The separator 50 is provided to prevent that the projected light beams Le, which will be explained hereinafter, enter the focusing lens 30 for photo reception.

Referring again to FIG. 1, a half mirror 60 is fixed to the left end portion of the second optical path space 12 such that both sides 61 of the half mirror 60 are sandwiched by a part of the casing 10.

A through hole 13A is formed in the casing 10 at the upper position of the left end portion of the second optical path space 12. The LED (light emitting diode) 70A for light projection is located in the through hole 13A. The LED 70A is attached to a supporting member 71 (also refer to FIG. 2). The supporting member 71 is attached to the upper surface of the casing 10 by a screw 74. A portion 72 which is projected to the central lower portion of the supporting member 71 is come into contact with a stairway portion 14 of the through hole 13A through an elastic O ring 73. By changing the fastening force of the screw 74, the elastic deformation degree of the O ring 73 partially changes, so that the inclination of the supporting member 71, namely, the direction of the projected light beams which are emitted from the LED 70A can be adjusted.

Another through hole 138 is also formed in the casing 10 at the left end position of the second optical path space 12. An LED 708 to emit the light having the wavelength different from that of the LED 70A is disposed in the through hole 13B. For example, the LED 70A emits the red light, whereas the LED 708 emits the green light. The LED 708 is also supported and fixed into the casing 10 by the supporting member 71, O ring 73, and screw 74. The portion 72 of the supporting member 71 is come into contact with the stairway portion 14 through the O ring 73. The light projecting direction of the LED 70B can be also adjusted similarly to the foregoing case.

Further, a focusing lens 80 for light projection is arranged in the right portion of the second optical path space 12. A supporting portion 81 of the focusing lens 80 is supported and fixed into the casing 10.

Figure 2:
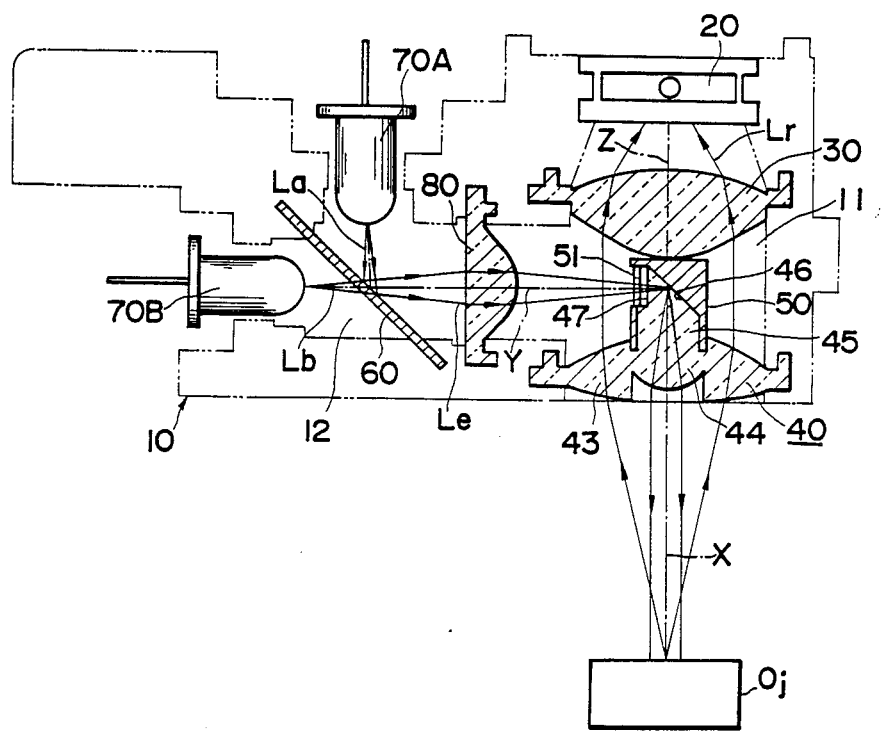
FIG. 2 is a diagram showing, in particular, an optical system of the photoelectric switching apparatus of FIG. 1.
Figure 3:
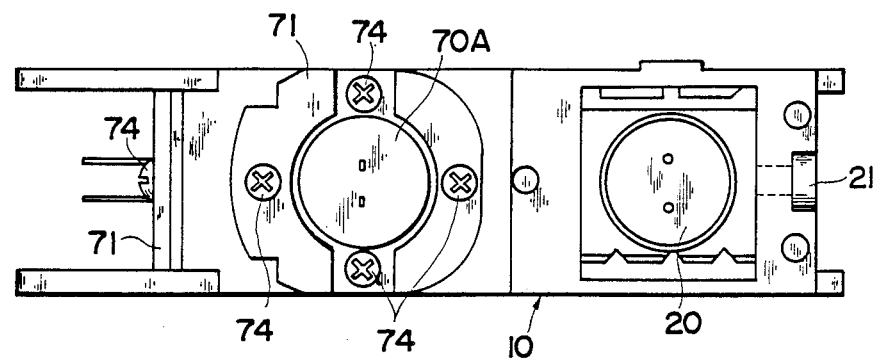
FIG. 3 is a plan view of the photoelectirc switching apparatus of FIG. 1.

The operation of the photoelectric switching apparatus of the embodiment will now be explained hereinafter with reference to FIG. 2.

The LEDs 70A and 70B are alternately lit on by a driving circuit (not shown). The projected light beams La of the LED 70A are reflected by the half mirror 60 and progress as projected light beams Le to the right on an optical axis Y in the second optical path space 12. On the other hand, the projected light beams Lb of the LED 70B are transmitted through the half mirror 60 and similarly transferred as the projected light beams Le to the right on the optical axis Y. Since the projected light beams Lb are transmitted and attenuated through the half mirror 60, the light emitting amount of the LED 70B is preferably set to be larger than that of the LED 70A by the amount of attenuation. The reason why the LEDs 70A and 70B having the different light emitting wavelengths are used is to make it possible to detect objects of various colors.

The projected light beams Le are transmitted through the focusing lens 80 and enter the elongated portion 45 from the incident surface 47 and are focused onto the reflecting surface 46. As described above, the light projecting directions of the LEDs 70A and 70B are adjusted using the screw 74 such that both projected light beams from the LEDs 70A and 70B are focused to the center of the reflecting surface 46. The projected light beams Le are reflected downwardly by the reflecting surface 46 and progress in the elongated portion 45 and in the central portion 44 of the objective lens 40 along an optical axis X of the central portion 44. Then, the beams Le are collimated and emitted downwardly from the lower surface of the central portion 44.

When an object Oj to be detected is placed in front of the objective lens 40, a part of the projected light beams Le reflected by the surface of the object Oj enters as the incident light beams Lr into the outer peripheral portion 43 of the objective lens 40. The incident light beams Lr are collimated by the outer peripheral portion 43 and progress upwardly along an optical axis Z (the optical axis Z coincides with the optical axis X in the portion below the reflecting surface 46) of the outer peripheral portion 43 in the first optical path space 11. Further, the incident light beams Lr are focused onto the photo sensing device 20 by the focusing lens 30. When the incident light beams Lr have reached the photo sensing device 20, a current flows through the photo sensing device 20 and the switching operation is performed by this current.

In the foregoing embodiment, the outer peripheral portion 43 of the objective lens 40 acts on the incident light beams Lr, the central portion 44 acts on the projected light beams Le, and the projected light beams Le are reflected by the reflecting surface 46. However, the projected light beams and the incident light beams may be also reversed. Namely, the projected light beams are input to the outer peripheral portion 43 of the objective lens 40 and the incident light beams are input to the central portion 44 and also deflected by the reflecting surface 46.

In the foregoing embodiment, the reflection factor has been raised by evaporation depositing a metal film onto the reflecting surface 46. However, it is also possible to constitute in such a manner that the reflecting surface is formed so that the incident angle of the projected light beams or incident light beams to the reflecting surface is set to be above the critical angle, thereby causing the total reflection of the projected light beams or incident light beams.

Further, the numbers, shapes, arrangement, and the like of the light projecting devices, photo sensing devices, lenses, and the like are not limited to those in the foregoing embodiment but can be also properly changed.

In the photoelectric switching apparatus of the invention, the elongated portion which extends on the optical axis in the central portion of the objective lens and has the reflecting surface at the end portion is formed integrally with the objective lens. Therefore, there are advantages such that the number of parts can be reduced and the manufacturing cost can be also decreased. In addition, there is no need to determine the position and angle of the reflecting surface in assembly and the apparatus can be easily assembled.

What is claimed is:

1. A photoelectric switching apparatus comprising:
   light projecting means;
   photo sensing means;
   objective lens means having a double structure comprising an outer peripheral portion and a central portion each of which acts as a lens;
   a reflecting surface for deflecting light on an optical axis in the central portion of said objective lens means to the side;
   said light projecting means being located on the optical axis of the light which is to be deflected by the reflecting surface, and said photo sensing means being located on the optical axis of the outer peripheral portion of the objective lens means;
   wherein an elongated portion, which extends on the optical axis of the central portion of the objective lens means and has said reflecting surface integrally located at the end portion thereof, is formed integrally with the objective lens means; and
   wherein a separator covers said elongated portion and a window means is formed in said separator, said window means being arranged on the optical axis of the light which is to be deflected and between the reflecting surface and said light projecting means.

2. A photoelectric switching apparatus according to claim 1, wherein said reflecting surface is formed by evaporation depositing a metal to the end portion of said elongated portion.

3. A photoelectric switching apparatus according to claim 1, wherein said reflecting surface is a total reflecting surface into which light beams from said light projecting means or to said photo sensing means are input at an incident angle above a critical angle.

4. A photoelectric switching apparatus according to claim 3, wherein said elongated portion has an incident surface corresponding to said window means, said incident surface being a flat surface.

* * * * *

UNITED STATES PATENT AND TRADEMARK OFFICE
CERTIFICATE OF CORRECTION

PATENT NO. : 4,963,021

DATED : October 16, 1990

INVENTOR(S) : Arata Nakamura et al

It is certified that error appears in the above-identified patent and that said Letters Patent is hereby corrected as shown below:

On the title page, Item [73] Assignee: "Hanazono" should read --Kyoto--.

Signed and Sealed this

Seventeenth Day of March, 1992

*Attest:*

HARRY F. MANBECK, JR.

*Attesting Officer*      *Commissioner of Patents and Trademarks*